(12) United States Patent
Taylor et al.

(10) Patent No.: US 10,215,282 B1
(45) Date of Patent: Feb. 26, 2019

(54) UNIDIRECTIONAL LABYRINTH SEAL SYSTEM

(71) Applicants: John Taylor, Hoover, AL (US); Alex F. Farris, III, Birmingham, AL (US)

(72) Inventors: John Taylor, Hoover, AL (US); Alex F. Farris, III, Birmingham, AL (US)

( * ) Notice: Subject to any disclaimer, the term of this patent is extended or adjusted under 35 U.S.C. 154(b) by 0 days.

(21) Appl. No.: 15/626,947

(22) Filed: Jun. 19, 2017

(51) Int. Cl.
*F16J 15/447* (2006.01)
*F16C 33/80* (2006.01)
*B65G 39/09* (2006.01)
*F16J 15/16* (2006.01)
*F16C 33/76* (2006.01)

(52) U.S. Cl.
CPC ............ *F16J 15/164* (2013.01); *B65G 39/09* (2013.01); *F16C 33/80* (2013.01); *F16C 33/805* (2013.01); *F16J 15/4476* (2013.01); *F16C 33/761* (2013.01)

(58) Field of Classification Search
CPC ...... F16J 15/4476; F16J 15/447; F16C 33/80; F16C 33/805; B65G 39/09
See application file for complete search history.

(56) References Cited

U.S. PATENT DOCUMENTS

| | | | | |
|---|---|---|---|---|
| 4,344,218 A | * | 8/1982 | Hooper | B21K 25/00 193/37 |
| 4,458,957 A | * | 7/1984 | Greener | B65G 39/09 277/420 |
| 4,972,939 A | * | 11/1990 | Uttke | B65G 39/09 198/501 |
| 5,025,917 A | * | 6/1991 | Smith | B65G 39/09 198/842 |
| 5,046,869 A | * | 9/1991 | Roberts | B65G 39/09 198/842 |
| 5,074,408 A | * | 12/1991 | Smith | B65G 39/09 198/842 |
| 6,206,182 B1 | | 3/2001 | Wilson et al. | |
| 6,234,293 B1 | * | 5/2001 | Fasoli | B65G 39/09 193/37 |
| 6,287,014 B1 | * | 9/2001 | Salla | B65G 39/09 193/37 |
| 6,385,849 B1 | * | 5/2002 | Bryant, Jr. | B65G 39/09 29/430 |
| 6,485,022 B1 | * | 11/2002 | Fedorovich | F16J 15/4474 277/303 |
| 6,641,512 B2 | | 11/2003 | Bryant et al. | |
| 7,971,882 B1 | | 7/2011 | Liang | |
| 8,146,733 B2 | | 4/2012 | Fox | |

(Continued)

*Primary Examiner* — Nicholas L Foster
(74) *Attorney, Agent, or Firm* — Lanier Ford Shaver & Payne, P.C.; Gerald M. Walsh

(57) ABSTRACT

A unidirectional annular labyrinth seal for a roller having an outer labyrinth seal and an inner labyrinth seal. The inner and outer seals have an annular outer wall, and an annular inner wall defining an interior and an interior surface. The interior of each seal has one or more annular middle walls and each has a central opening. The outer labyrinth seal and the inner labyrinth seal engage each other so that the outer walls, the inner walls, and the one or more middle walls cooperate to form a labyrinth in the unidirectional annular labyrinth seal. An annular interior seal is positioned in the interior of the outer labyrinth seal or in the interior of the inner labyrinth seal. The unidirectional annular labyrinth seal allows air to flow out of the roller but not into the roller.

10 Claims, 5 Drawing Sheets

(56) References Cited

U.S. PATENT DOCUMENTS

| | | |
|---|---|---|
| 8,591,116 B2 | 11/2013 | Fedorovich |
| 8,641,288 B2 | 2/2014 | Metten et al. |
| 9,133,940 B1 | 9/2015 | Taylor et al. |
| 2006/0147141 A1 | 7/2006 | Harwood et al. |
| 2008/0153683 A1 | 6/2008 | Kirkpatrick et al. |

* cited by examiner

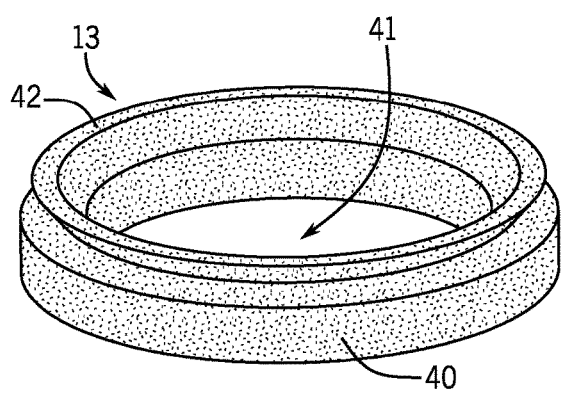
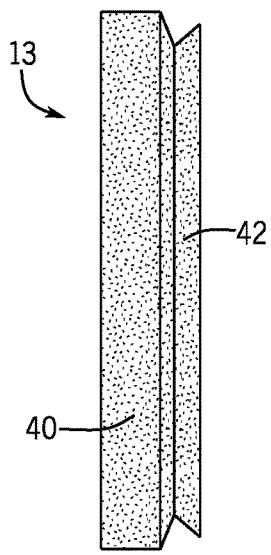
FIG. 4
FIG. 5
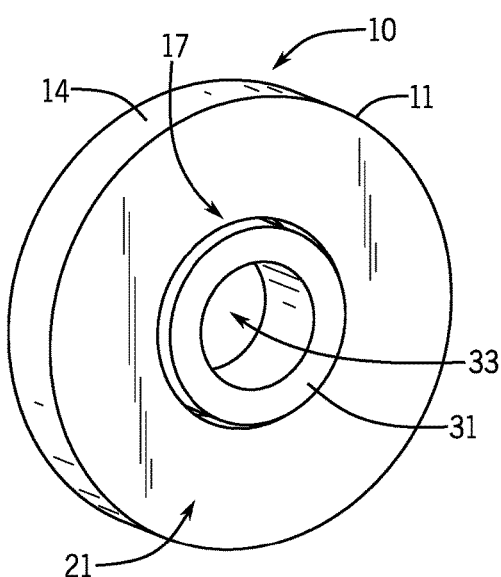
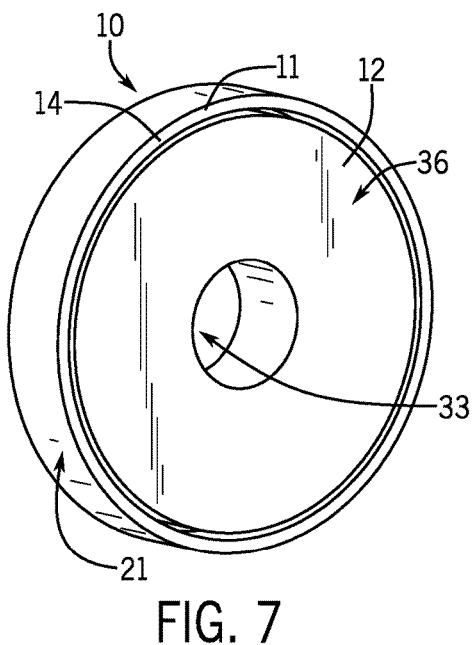
FIG. 6
FIG. 7

UNIDIRECTIONAL LABYRINTH SEAL SYSTEM

FIELD OF THE INVENTION

This invention relates to labyrinth seals and, more particularly, to annular unidirectional labyrinth seals for idler rollers.

BACKGROUND OF THE INVENTION

In the use of idler rollers it is known to have an idler roller system consisting of a fixed shaft having an idler roller rotatably mounted thereto, with an interposed bearing which facilitates the rotation of the idler roller about the shaft. It is also known to provide labyrinth seals for idler rollers. This combination of idler rollers and labyrinth seals is used, for example, with conveyor belts in mining and other operations. Labyrinth seals employ a tortuous network of passages between the contaminating environment and the idler roller bearing assembly. Contaminants can only infiltrate the bearing assembly by transversing the tortuous path. Idler roller failure is often caused by airborne moisture passing through the labyrinth seals.

During operation the temperature of an idler roller increases, for example, due to friction caused by a conveyor belt moving across the idler roller. This increase in temperature causes air inside the roller to expand and be expelled through the labyrinth seals. Thereafter, when the temperature of the roller decreases, the air inside the idler roller contracts. The air outside the idler roller is then drawn back inside the idler roller through the labyrinth seal. This air that is drawn into the idler roller contains moisture and contaminants which cause corrosion and damage to the bearings and races within the idler roller.

U.S. Pat. No. 9,133,940 describes a unidirectional labyrinth seal that allows air inside a roller to escape through the seal but blocks air from outside the roller from entering through the seal into the roller. Flexible annular fins positioned on a circular plate form an outer labyrinth seal. Annular ribs positioned on an end of an idler roller form an inner labyrinth seal. The fins project into recesses formed by the annular ribs, thereby forming the unidirectional annular labyrinth seal. The annular fins engage the annular ribs when the temperature of air within an interior of the roller is similar to the temperature of air exterior to the roller, thereby closing the labyrinth seal. The flexible annular fins bend away from the annular ribs when the temperature of air within the interior of the roller is higher than that of air exterior to the roller, thereby opening the labyrinth seal and allowing heated air within the interior of the roller to escape through the labyrinth seal. To replace the outer labyrinth seal it is necessary to provide a new plate with fins. It is difficult to obtain the best flexibility of the fins when they need to be formed as part of the plate. Since the inner labyrinth seal is part of the roller it is necessary to replace the whole roller to replace the inner labyrinth seal. What is needed is a unidirectional labyrinth seal system that is easier to construct and easily replaceable.

SUMMARY OF THE INVENTION

The invention is a unidirectional annular labyrinth seal having an outer labyrinth seal and an inner labyrinth seal. Each seal has an outer surface, an annular outer wall, and an annular inner wall defining an interior and an interior surface. The interior of each seal has one or more annular middle walls and each has a central opening. The outer labyrinth seal and the inner labyrinth seal engage each other so that the outer walls, the inner walls, and the one or more middle walls cooperate to form a labyrinth in the unidirectional annular labyrinth seal. An annular interior seal is positioned in the interior of the outer labyrinth seal or in the interior of the inner labyrinth seal. The interior seal is constructed to allow air to flow from the outer surface of the inner labyrinth seal through the labyrinth to the outer surface of the outer labyrinth seal and to prevent air from flowing from the outer surface of the outer labyrinth seal through the labyrinth to the outer surface of the inner labyrinth seal.

The annular inner wall of the inner labyrinth seal fits over the annular inner wall of the outer labyrinth seal to form the unidirectional annular labyrinth seal or the annular inner wall of the outer labyrinth seal fits over the annular inner wall of the inner labyrinth seal to form the unidirectional annular labyrinth seal. The inner labyrinth seal and the outer labyrinth seal are rotatable with respect to each other. The interior seal has a base and a fin extending away from the base and the base is reversibly insertable into the inner labyrinth seal or the outer labyrinth seal. The base of the interior seal engages the interior surface of the inner seal and the fin engages the interior surface of the outer seal or the base of the interior seal engages the interior surface of the outer seal and the fin engages the interior surface of the inner seal.

An advantage of the unidirectional labyrinth seal of the present invention is that air can move through the seal in only one direction.

Another advantage is the unidirectional labyrinth seal allows air to flow out of the interior of a roller but prevents air outside the roller from flowing into the interior of the roller.

Another advantage is a unidirectional labyrinth seal that prevents corrosion and contamination of a bearing contained inside the roller.

Another advantage is that the unidirectional labyrinth seal is easy to manufacture, easy to bond to the roller and shaft, and easy to replace.

BRIEF DESCRIPTION OF THE DRAWINGS

FIG. 4 shows a top, perspective view of the interior seal.

FIG. 5 shows a side view of the interior seal.

FIG. 6 shows the outer labyrinth seal inserted into the inner labyrinth seal, to form the unidirectional labyrinth seal of the present invention, viewed from the outer surface of the inner labyrinth seal.

FIG. 7 shows the outer labyrinth seal inserted into the inner labyrinth seal viewed from the outer surface of the outer labyrinth seal.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Figure 1:
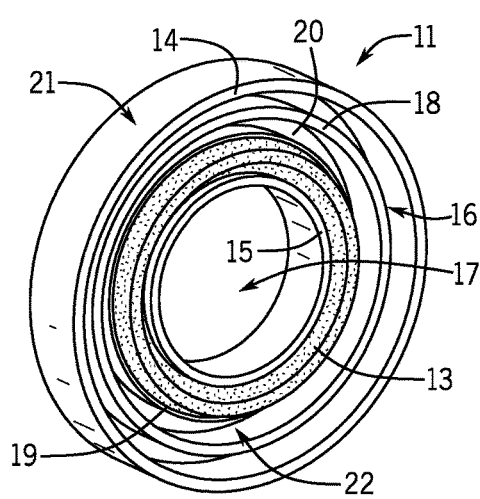
FIG. 1 shows an interior, perspective view of an inner labyrinth seal of the present invention showing the placement of an interior seal.

FIG. 1 shows an interior, perspective view of an annular inner labyrinth seal 11 showing the placement of an annular interior seal 13. The inner labyrinth seal 11 has an annular outer wall 14, an annular inner wall 15 defining an interior 16, an outer surface 21, and an inner surface 22. Inner wall 15 defines a central opening 17. The interior 16 has annular middle walls 18. The walls 18 form annular recesses 20. The annular interior seal 13 is positioned around the inner wall 15 and fits into a recess 20 formed by a middle wall 19 and the inner wall 15.

Figure 2:
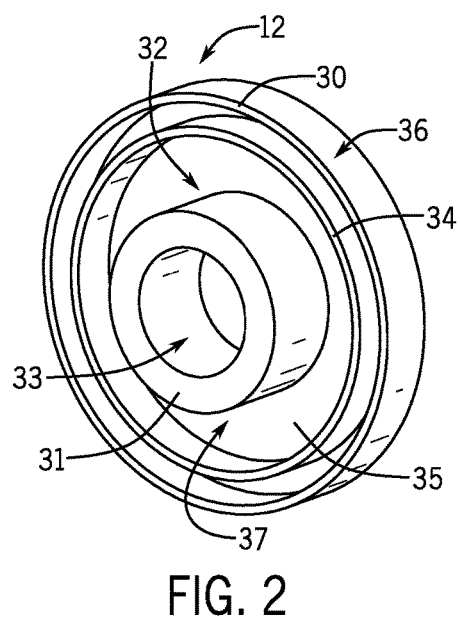
FIG. 2 shows an interior, perspective view of an outer labyrinth seal of the present invention.

FIG. 2 shows an interior, perspective view of an annular outer labyrinth seal 12. The outer labyrinth seal 12 has an annular outer wall 30, an annular inner wall 31 defining an interior 32, an outer surface 36, and an inner surface 37. Inner wall 31 defines a central opening 33. The interior 32 has annular middle walls 34. The walls form annular recesses 35.

Figure 3:
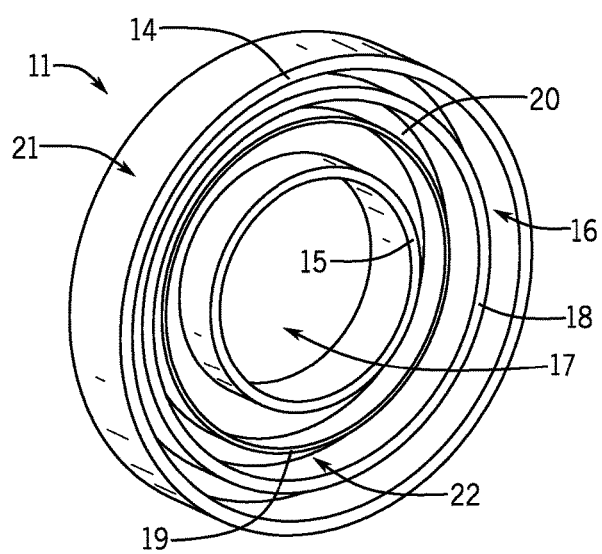
FIG. 3 shows an interior, perspective view of the inner labyrinth seal with the interior seal removed.

FIG. 3 shows an interior, perspective view of the inner labyrinth seal 11 with the interior seal 13 removed. FIG. 4 shows a top, perspective view of the interior seal 13. Interior seal 13 has an annular base 40 defining an interior 41. An annular fin 42 extends out from the base 40. FIG. 5 shows a side view of the interior seal 13.

FIG. 6 shows the outer labyrinth seal 12 inserted into the inner labyrinth seal 11, to form the unidirectional labyrinth seal 10 of the present invention, viewed from the outer surface 21 of the inner labyrinth seal 11. FIG. 7 shows the outer labyrinth seal 12 inserted into the inner labyrinth seal 11, viewed from the outer surface 36 of the outer labyrinth seal 12. Once assembled, the axially extending walls of both the inner labyrinth seal 11 and the outer labyrinth seal 12 cooperate to form the unidirectional labyrinth seal 10, in a manner which is well known in the art.

Figure 8:
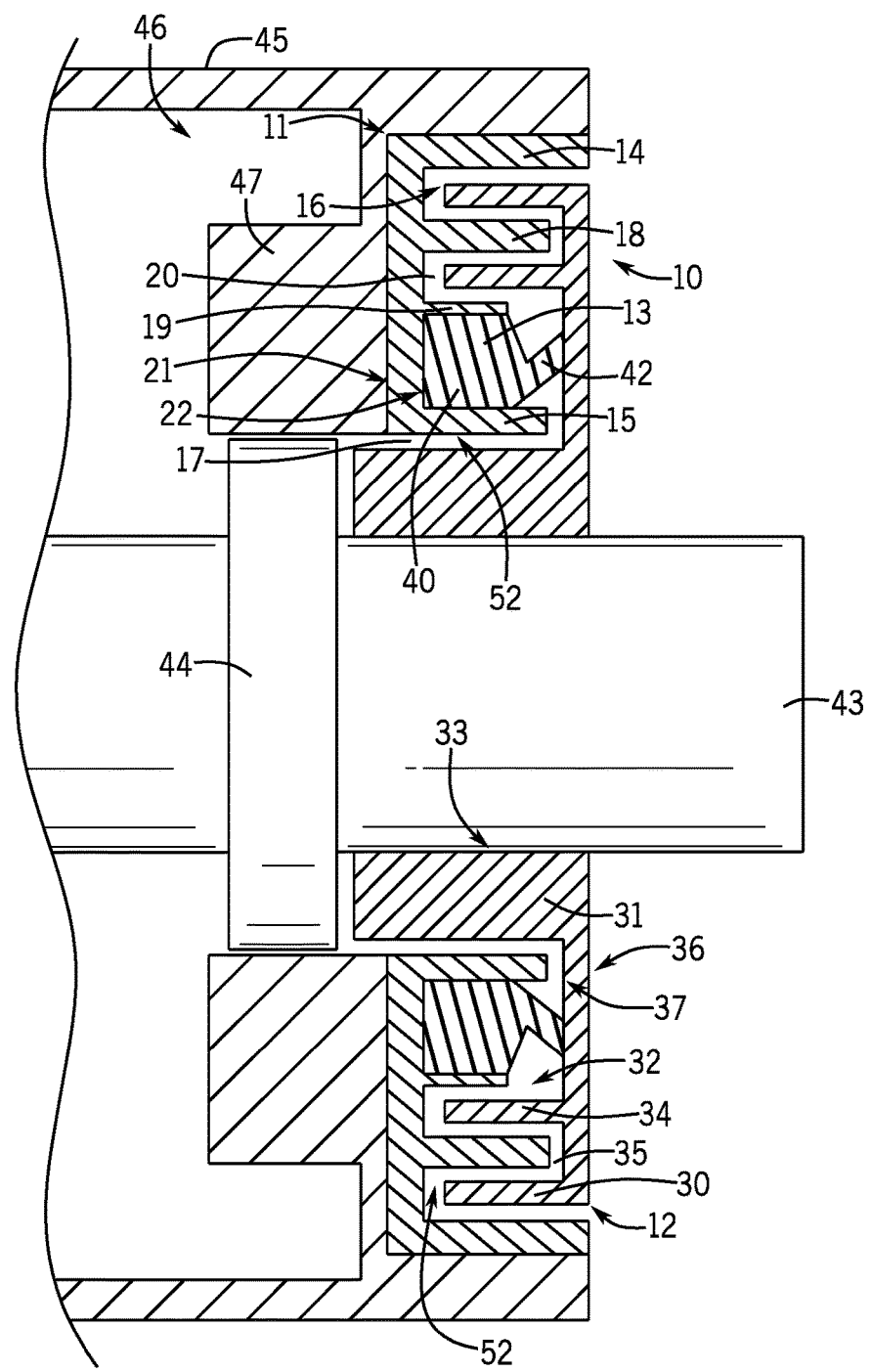
FIG. 8 illustrates a sectional view of the unidirectional labyrinth seal with the outer labyrinth seal positioned on a shaft and a roller positioned on the inner labyrinth seal.

FIG. 8 illustrates a sectional view of the unidirectional labyrinth seal 10 with the outer labyrinth seal 12 positioned on a shaft 43 and a roller 45 positioned on the outer wall 14 of the inner labyrinth seal 11. The roller 45 has a hollow interior 46 and an interior annular projection 47 which engages a bearing 44 attached to the shaft 43. In this configuration the inner wall 31 of the outer labyrinth seal 12 is fixed to the shaft 43. The shaft 43 is fixed to a support (not shown) so the shaft 43 and the outer labyrinth seal 12 do not rotate. Roller 45 rolls over roller bearing 44 and the inner labyrinth seal 11 rotates within the outer labyrinth seal 12. The gap 52 between the inner labyrinth seal 11 and the outer labyrinth seal 12 forms a labyrinth for the flow of air. The fin 42 of the interior seal 13 is shown engaging the interior surface 37 of the outer labyrinth seal, thereby closing the labyrinth 52.

Figure 9:
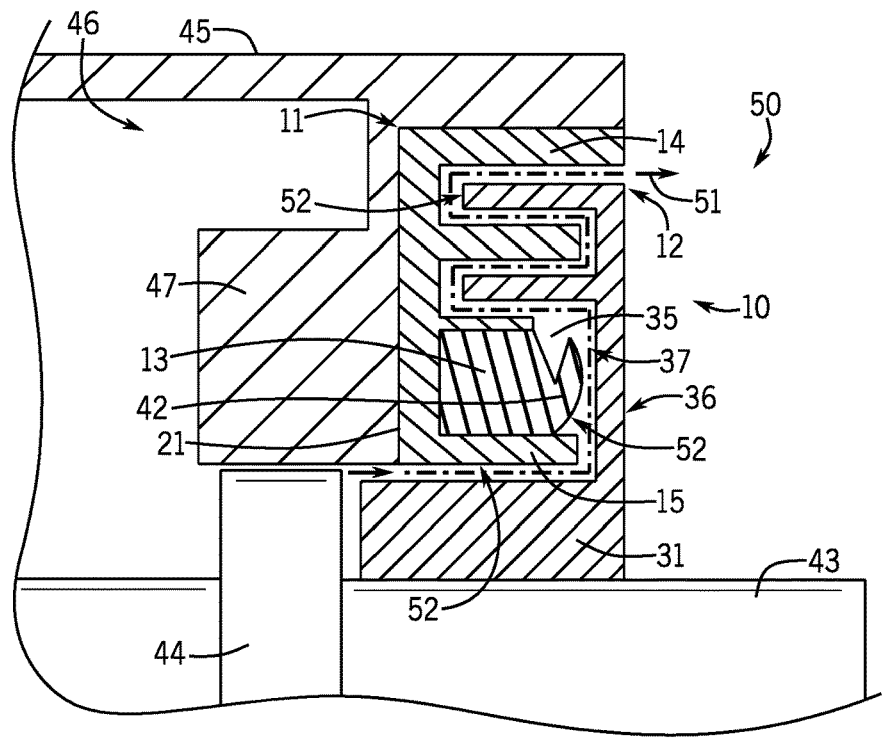
FIG. 9 illustrates a sectional view of the unidirectional labyrinth seal showing the interior seal allowing air to flow from the interior of the roller, through the labyrinth of the unidirectional labyrinth seal, and out to the atmosphere.

FIG. 9 illustrates a sectional view of the unidirectional labyrinth seal 10 showing the interior seal 13 allowing air to flow from the interior 46 of the roller 45, through the labyrinth (gap 52) of the unidirectional labyrinth seal 10, and to the outside 50 of the roller 45. When in use, roller 45 becomes heated so that air within the roller 45 becomes heated and its pressure is greater than the air outside the roller 45. Under these conditions the air inside the roller 45 flows from the outer surface 21 of the inner labyrinth seal 11 into the labyrinth 52 (shown by dashed arrow 51) and pushes the fin 42 of the interior seal 13 away from the interior surface 37 of the outer labyrinth seal 12, thereby opening the labyrinth 52 and allowing air from the roller 45 to be exhausted to the outer surface 36 of the outer labyrinth seal 12, outside 50 of the roller 45.

Figure 10:
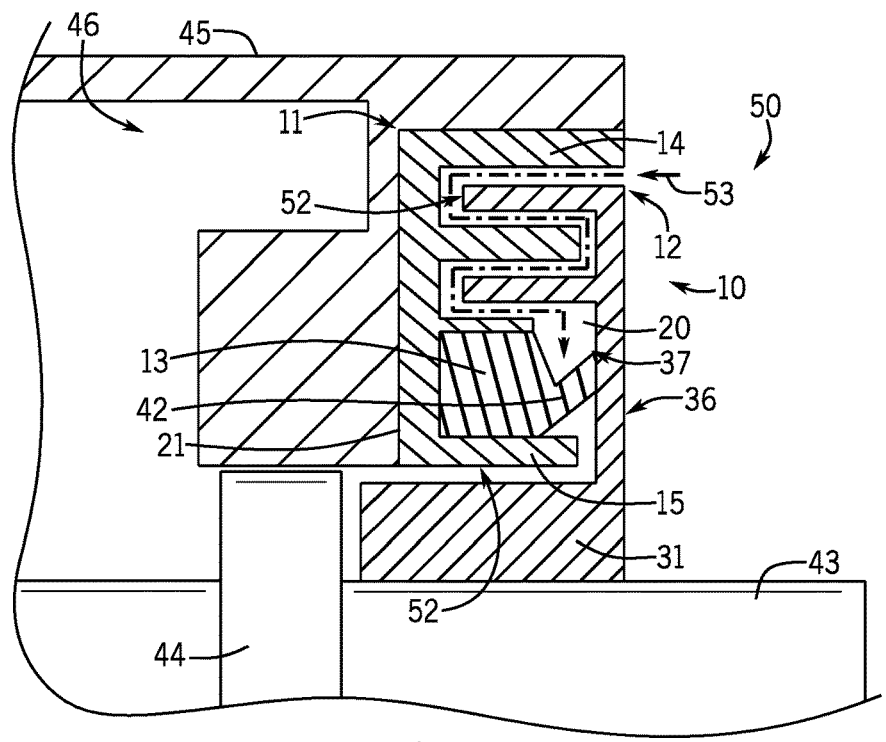
FIG. 10 illustrates a sectional view of the unidirectional labyrinth seal showing the interior seal preventing air from flowing from the outside of the roller, through the labyrinth of the unidirectional labyrinth seal, and into the interior of the roller.

FIG. 10 illustrates a sectional view of the unidirectional labyrinth seal 10 showing the interior seal 13 preventing air from flowing from the outside 50 of the roller 45, through the labyrinth 52 of the unidirectional labyrinth seal 10, and into the interior 46 of the roller 45. When the roller 45 cools down after use, the air in the interior 46 of the roller 45 falls to ambient temperature. Under these conditions, the fin 42 of the interior seal 13 engages the inner surface 37 of the outer labyrinth seal 12 and closes the labyrinth 52. Air from the outside 50, at the outer surface 36 of the outer labyrinth seal 12, thus, cannot enter the interior 46 of the roller 45. This action of the unidirectional labyrinth seal 10 extends the life of the bearing 44, compared to standard roller bearing seals. The outside air 50 contains moisture and other substances which cause a roller bearing 44 to become contaminated and corroded, which is prevented by the unidirectional labyrinth seal 10.

Figure 11:
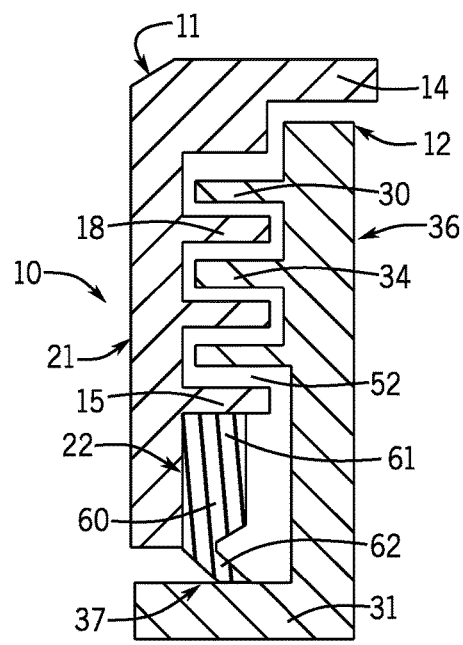
FIG. 11 illustrates a sectional view of an alternate embodiment of the unidirectional labyrinth seal wherein the fin of the interior seal engages the inner surface of the inner wall of the outer labyrinth seal.

FIG. 11 illustrates a sectional view of an alternate embodiment of the unidirectional labyrinth seal 10 wherein the base 61 of the interior seal 60 is positioned on the inner surface 22 of the inner wall 15 of the inner labyrinth seal 11. The fin 62 of the interior seal 60 engages the inner surface 37 of the inner wall 31 of the outer labyrinth seal 12.

Figure 12:
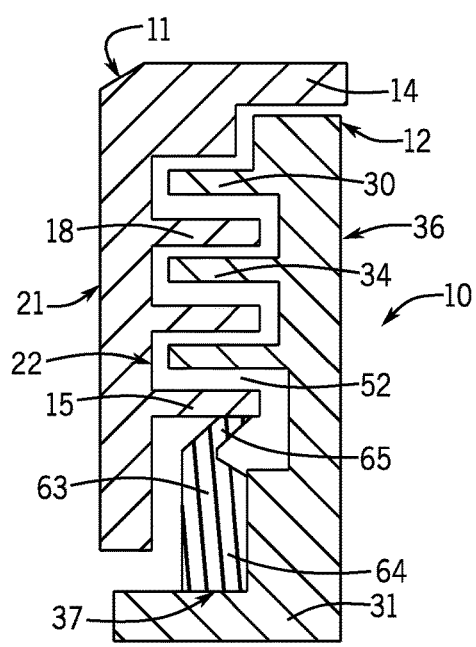
FIG. 12 illustrates a sectional view of an alternate embodiment of the unidirectional labyrinth seal wherein the interior seal is positioned in the outer labyrinth seal.

FIG. 12 illustrates a sectional view of an alternate embodiment of the unidirectional labyrinth seal 10 wherein the interior seal 63 is positioned in the outer labyrinth seal 12. The base 64 of the interior seal 63 is positioned on the inner surface 37 of the inner wall 31 of the outer labyrinth seal 12 and the fin 65 of the interior seal 63 engages the inner surface 22 of the inner wall 15 of the inner labyrinth seal 11.

Figure 13:
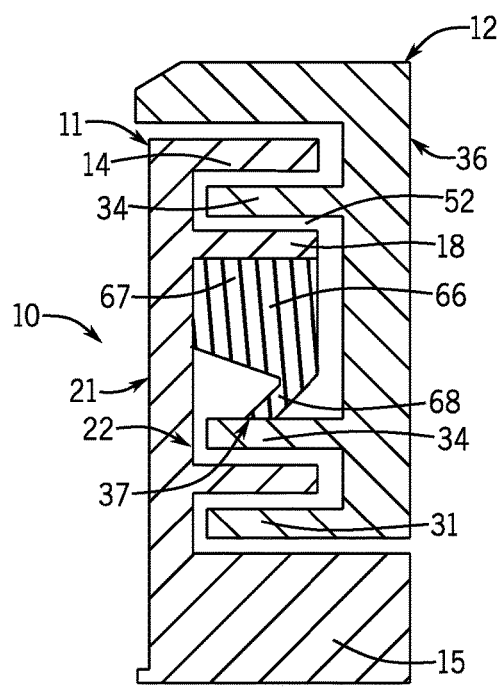
FIG. 13 illustrates a sectional view of an alternate embodiment of the unidirectional labyrinth seal wherein the inner labyrinth seal is inserted into the outer labyrinth seal and the fin of the interior seal engages the inner surface of a middle wall of the outer labyrinth seal.

FIG. 13 illustrates a sectional view of an alternate embodiment of the unidirectional labyrinth seal 10 wherein the inner labyrinth seal 11 is inserted into the outer labyrinth seal 12. The base 67 of the interior seal 66 is positioned on the inner surface 22 of a middle wall 18 of the inner labyrinth seal 11 and the fin 68 of the interior seal 66 engages the inner surface 37 of a middle wall 34 of the outer labyrinth seal 12.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the unidirectional labyrinth seal can be any size and fit in any roller. The roller can be kept fixed in one position and the shaft can rotate. The interior seal can be positioned in either the inner labyrinth seal or the outer labyrinth seal. The contact between the fin and the inner surface may be frictionless or near frictionless. The inner or outer seals can be bonded to the shaft or roller by means well known in the art. The unidirectional labyrinth seal may be constructed of any type of suitable plastic or metal or a combination thereof.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A unidirectional annular labyrinth seal, comprising:
   a) an outer labyrinth seal portion and an inner labyrinth seal portion, each having an outer surface, an annular outer wall, and an annular inner wall, each of the outer surface, the annular outer wall, and the annular inner wall together defining an interior of the respective outer labyrinth seal portion or of the inner labyrinth seal portion;
   b) each said interior having one or more annular middle walls, wherein the annular outer wall, the annular inner wall, and the one or more annular middle wall are all axially projecting walls;
   c) said outer labyrinth seal portion and said inner labyrinth seal portion each having a central opening;
   d) said outer labyrinth seal portion and said inner labyrinth seal portion engaging each other so that said annular outer walls, said annular inner walls, and said one or more annular middle walls cooperate to form a labyrinth in said unidirectional annular labyrinth seal; and
   e) an annular interior seal mounted to both one of the one or more annular middle walls and the annular inner wall of said inner labyrinth seal portion, wherein said annular interior seal has a base and a fin projecting in a radially outward direction, said direction being away from a shaft to which the outer labyrinth seal is mounted and the inner and outer labyrinth seal portions surround, said fin forming a V-shape with said base, and said fin contacting a radially extending wall of said outer labyrinth seal portion, to allow air to flow from said outer surface of said inner labyrinth seal portion through said labyrinth to said outer surface of said outer labyrinth seal portion and to prevent air from flowing from said outer surface of said outer labyrinth seal portion through said labyrinth to said outer surface of said inner labyrinth seal portion.

2. The unidirectional annular labyrinth seal of claim 1 wherein the annular inner wall of the inner labyrinth seal portion fits over the annular inner wall of the outer labyrinth seal portion to form part of the labyrinth.

3. The unidirectional annular labyrinth seal of claim 1 wherein said inner labyrinth seal portion and said outer labyrinth seal portion are rotatable with respect to each other.

4. The unidirectional annular labyrinth seal of claim 1 wherein said fin does not extend beyond the outer circumference of said base.

5. The unidirectional annular labyrinth seal of claim 1 wherein said base is reversibly insertable into said inner labyrinth seal portion or said outer labyrinth seal portion.

6. The unidirectional annular labyrinth seal of claim 1 wherein said annular inner wall of said inner labyrinth seal portion is positioned in an interior of said annular interior seal.

7. A unidirectional annular labyrinth seal, comprising:
   a) an outer labyrinth seal portion and an inner labyrinth seal portion, each having an outer surface, an annular outer wall, and an annular inner wall, each of the outer surface, the annular outer wall, and the annular inner wall together defining an interior of the respective outer labyrinth seal portion or of the inner labyrinth seal portion;
   b) each said interior having one or more annular middle walls, wherein the annular outer wall, the annular inner wall, and the one or more annular middle wall are all axially projecting walls;
   c) said outer labyrinth seal portion and said inner labyrinth seal portion each having a central opening;
   d) said outer labyrinth seal portion and said inner labyrinth seal portion engaging each other so that said annular outer walls, said annular inner walls, and said one or more annular middle walls cooperate to form a labyrinth in said unidirectional annular labyrinth seal;
   e) an annular interior seal mounted to both one of the one or more annular middle walls and the annular inner wall of said inner labyrinth seal portion, wherein said annular interior seal has a base and a fin projecting in a radially outward direction, said direction being away from a shaft to which the outer labyrinth seal is mounted and the inner and outer labyrinth seal portions surround, said fin forming a V-shape with said base, and said fin contacting a radially extending wall of said outer labyrinth seal portion, to allow air to flow from said outer surface of said inner labyrinth seal portion through said labyrinth to said outer surface of said outer labyrinth seal portion and to prevent air from flowing from said outer surface of said outer labyrinth seal portion through said labyrinth to said outer surface of said inner labyrinth seal portion;
   f) said fin does not extend beyond the outer circumference of said base;
   g) said base is reversibly insertable into said inner labyrinth seal portion or said outer labyrinth seal portion; and
   h) said annular inner wall of said inner labyrinth seal portion is positioned in an interior of said annular interior seal.

8. The unidirectional annular labyrinth seal of claim 7 wherein the annular inner wall of the inner labyrinth seal portion fits over the annular inner wall of the outer labyrinth seal portion to form part of the labyrinth.

9. The unidirectional annular labyrinth seal of claim 7 wherein said inner labyrinth seal portion and said outer labyrinth seal portion are rotatable with respect to each other.

10. A unidirectional annular labyrinth seal, comprising:
    a) an outer labyrinth seal portion and an inner labyrinth seal portion, each having an outer surface, an annular outer wall, and an annular inner wall, each of the outer surface, the annular outer wall, and the annular inner wall together defining an interior of the respective outer labyrinth seal portion or of the inner labyrinth seal portion;

b) each said interior having one or more annular middle walls, wherein the annular outer wall, the annular inner wall, and the one or more annular middle wall are all axially projecting walls;
c) said outer labyrinth seal portion and said inner labyrinth seal portion each having a central opening;
d) said outer labyrinth seal portion and said inner labyrinth seal portion engaging each other so that said annular outer walls, said annular inner walls, and said one or more annular middle walls cooperate to form a labyrinth in said unidirectional annular labyrinth seal;
e) an annular interior seal mounted to both one of the one or more annular middle walls and the annular inner wall of said inner labyrinth seal portion, wherein said annular interior seal has a base and a fin projecting in a radially outward direction, said direction being away from a shaft to which the outer labyrinth seal is mounted and the inner and outer labyrinth seal portions surround, said fin forming a V-shape with said base, and said fin contacting a radially extending wall of said outer labyrinth seal portion, to allow air to flow from said outer surface of said inner labyrinth seal portion through said labyrinth to said outer surface of said outer labyrinth seal portion and to prevent air from flowing from said outer surface of said outer labyrinth seal portion through said labyrinth to said outer surface of said inner labyrinth seal portion;
f) said fin does not extend beyond the outer circumference of said base;
g) said base is reversibly insertable into said inner labyrinth seal portion or said outer labyrinth seal portion;
h) said annular inner wall of said inner labyrinth seal portion is positioned in an interior of said annular interior seal;
i) the annular inner wall of the inner labyrinth seal portion fits over the annular inner wall of the outer labyrinth seal portion to form part of the labyrinth; and
j) said inner labyrinth seal portion and said outer labyrinth seal portion are rotatable with respect to each other.

* * * * *